US012648887B2

(12) United States Patent
Serola et al.

(10) Patent No.: US 12,648,887 B2
(45) Date of Patent: Jun. 9, 2026

(54) CONTOURED DEVICE FOR ANATOMICAL TRACTION OR CORRECTION OF THE SPINE

(71) Applicant: Richard J. Serola, Loves Park, IL (US)

(72) Inventors: Richard J. Serola, Roscoe, IL (US); Brian S. Potempa, Freeport, IL (US); Michael M. Potempa, Freeport, IL (US)

(73) Assignee: Serola Biomechanics, Inc., Loves Park, IL (US)

( * ) Notice: Subject to any disclaimer, the term of this patent is extended or adjusted under 35 U.S.C. 154(b) by 1361 days.

(21) Appl. No.: 15/405,080

(22) Filed: Jan. 12, 2017

(65) Prior Publication Data

US 2017/0202723 A1 Jul. 20, 2017

Related U.S. Application Data

(60) Provisional application No. 62/278,436, filed on Jan. 14, 2016, provisional application No. 62/278,439, filed on Jan. 14, 2016.

(51) Int. Cl.
*A61H 1/00* (2006.01)
*A47C 20/02* (2006.01)
(Continued)

(52) U.S. Cl.
CPC ........... *A61H 1/008* (2013.01); *A47C 20/026* (2013.01); *A47C 20/027* (2013.01);
(Continued)

(58) Field of Classification Search
CPC . A61H 1/00; A61H 1/008; A61H 1/02; A61H 1/0292; A61H 2203/0456;
(Continued)

(56) References Cited

U.S. PATENT DOCUMENTS 2,769,185 A * 11/1956 Biederman ............ A47C 7/029 5/653
4,506,929 A * 3/1985 Josefek .................. A47C 7/425 297/230.13
(Continued)

FOREIGN PATENT DOCUMENTS

| | | | | |
|---|---|---|---|---|
| JP | H09 117348 | 5/1997 | | |
| WO | 2008/143469 | 11/2008 | | |
| WO | WO-2008143469 A2 * | 11/2008 | ............... | A61F 5/01 |

OTHER PUBLICATIONS

Engineering ToolBox, (2004). Friction and Friction Coefficients. [online] Available at: https://www.engineeringtoolbox.com/friction-coefficients-d_778.html. (Year: 2004).*
(Continued)

*Primary Examiner* — Rachel T Sippel
*Assistant Examiner* — Jacqueline M Pinderski
(74) *Attorney, Agent, or Firm* — Reinhart Boerner Van Deuren P.C.

(57) ABSTRACT

An anatomical support device including a lower portion and a contoured upper portion is provided. The lower portion has a length measured along a bottom side extending between a front and a rear of the lower portion. The upper portion extends from a top side of the lower portion. The upper portion separates a first support region from a second support region of the top side. The upper portion has a width that is generally perpendicular and less than the length. The upper portion has a center line is continuously curved along at least 95% of the length. The upper portion may have a greater gripping characteristic than the support regions. The bottom side may be stiffer than the top side or the upper portion. Further, the upper portion may be tapered between the front and rear.

31 Claims, 10 Drawing Sheets

(51) Int. Cl.
*A47G 9/10* (2006.01)
*A61H 1/02* (2006.01)

(52) U.S. Cl.
CPC ......... *A47G 9/1027* (2013.01); *A47G 9/1081* (2013.01); *A61H 1/0292* (2013.01); *A61H 2201/0103* (2013.01); *A61H 2201/1284* (2013.01); *A61H 2201/1619* (2013.01); *A61H 2201/1623* (2013.01); *A61H 2201/1628* (2013.01); *A61H 2201/1645* (2013.01); *A61H 2201/168* (2013.01); *A61H 2201/1695* (2013.01); *A61H 2203/0456* (2013.01)

(58) Field of Classification Search
CPC ...... A61H 2201/1695; A61H 2201/168; A61H 2201/1645; A61H 2201/1628; A61H 2201/1623; A61H 2201/1619; A61H 2201/1284; A61H 2201/0103; A47G 9/00; A47G 9/10; A47G 9/1081; A47G 9/1027; A47C 20/00–02; A47C 20/026–027
See application file for complete search history.

(56) References Cited

U.S. PATENT DOCUMENTS

| | | | | | |
|---|---|---|---|---|---|
| 4,516,568 | A * | 5/1985 | Baxter | A47C 7/425 | 297/230.14 |
| 4,832,007 | A * | 5/1989 | Davis, Jr. | A47G 9/1081 | 250/580 |
| 4,835,801 | A * | 6/1989 | Walpin | A47C 7/425 | 297/452.32 |
| 4,969,222 | A * | 11/1990 | Serola | A61F 5/00 | 5/652 |
| 5,201,761 | A * | 4/1993 | Serola | A47C 7/425 | 606/240 |
| 5,466,214 | A * | 11/1995 | Calderon-Garciduenas | A61F 5/026 | 602/19 |
| 5,685,613 | A * | 11/1997 | Franzen, Jr. | A47G 9/10 | 297/397 |
| 6,132,004 | A | 10/2000 | Carlino | | |
| 7,055,199 | B2 | 6/2006 | Thompson | | |
| D540,606 | S * | 4/2007 | Greenberg | D6/604 | |
| 8,695,135 | B2 | 4/2014 | Berube | | |
| 9,078,528 | B2 * | 7/2015 | Ramdath | A47C 20/027 | |
| 2004/0147959 | A1 * | 7/2004 | Shin | A61F 5/01 | 606/240 |
| 2004/0211004 | A1 | 10/2004 | Thompson | | |
| 2004/0220029 | A1 * | 11/2004 | Chen | A61H 1/0292 | 482/142 |
| 2004/0250350 | A1 | 12/2004 | Leonard | | |
| 2007/0039102 | A1 * | 2/2007 | Thompson | A47C 7/467 | 5/655.3 |
| 2008/0315644 | A1 | 12/2008 | Briscoe | | |
| 2013/0046343 | A1 * | 2/2013 | Adamski | A61H 1/008 | 606/240 |
| 2015/0359342 | A1 | 12/2015 | Vanderhorst et al. | | |
| 2016/0095781 | A1 * | 4/2016 | Hudson | A61H 7/001 | 601/136 |

OTHER PUBLICATIONS

Serola Biomechanics; Sacrotrac; page from the internet; known prior to Jan. 12, 2017; 1 page; http://www.serola.eu/sacrotrac.aspx.

* cited by examiner

CONTOURED DEVICE FOR ANATOMICAL TRACTION OR CORRECTION OF THE SPINE

CROSS-REFERENCE TO RELATED PATENT APPLICATIONS

This patent application claims the benefit of U.S. Provisional Patent Application No. 62/278,436, filed Jan. 14, 2016, and U.S. Provisional Patent Application No. 62/278,439, filed Jan. 14, 2016, the entire teachings and disclosure of which are incorporated herein by reference thereto.

FIELD OF THE INVENTION

This invention generally relates to an anatomical support device and more particularly to an anatomical support device for supporting the curvatures of the spine.

BACKGROUND OF THE INVENTION

A normal spine has both kyphotic and lordotic curves. Normally, the cervical portion and the lumbar portion of the spine have lordotic curves, while the thoracic portion of the spin has a kyphotic curve. The amount of curvature of these three spinal portions varies. This combination of kyphotic and lordotic curves allows people to sit and stand upright.

While the amount of curvature is generally small, it is not insignificant. If the curvature of an area of the spine is too great or too small, then problems can arise.

For example, reduction of the cervical curve alters the biomechanics of the entire spine. Reduction of the curvature is associated with poor posture, especially forward head placement. Reduced cervical curvature may result in muscle tension, reduced blood supply to the muscles and tissues of the head and neck, and accelerated degeneration of the spine. Accelerated degeneration of the spine can result in osteoarthritis, spondylosis, disc herniation, or facet syndrome.

When a person suffers from a problem with spinal curvature, usually all three areas of the spine also have problems with curvature as the spine attempts to compensate for the increased or decreased curvature. For example, if there is a problem with the curvature of the cervical spine, then the lumbar spine will likely also have curvature problems.

One popular method of treatments is to have the patient lay face down and then position a pillow (also referred to as an anatomical support device) under a region of the back. In order for this method to be helpful to the patient's condition, the pillow must have a curvature which matches the desired curvature of the patient's spine.

Examples of such pillows are shown in U.S. Pat. No. 4,969,222, entitled CONTOURED SUPPORT PILLOW; U.S. Pat. No. 5,201,761, entitled DEVICE AND METHOD FOR REDUCING LUMBAR LORDOSIS WHILE SUPINE AND SUPPORTING THE LUMBAR CURVE WHEN SEATED, U.S. Pat. No. 7,055,199, entitled LUMBAR BACK SUPPORT DEVICE, and U.S. Pat. No. 8,695,135, entitled SACRUM SUPPORT PILLOW.

A problem with treatment using prior pillows is that multiple pillows are needed to treat different portions of the spine for the patient. Because the preferred spinal curvature varies along the spine, different pillows are needed for each area. Thus, a patient seeking help for spinal curvature in different areas must acquire different pillows. This results in several problems.

First, there is cost. Each additional pillow is an additional cost. Thus, patients may purchase only a single pillow to treat the problematic specific spinal area, rather than purchase multiple pillows to treat the entire spine.

Second, using multiple pillows for treatment can be complicated. Each time a different portion of the spine is to be treated, then a different pillow is needed. If the patient is doing the treatment alone, she/he would need to keep the various pillows nearby and then change the pillows. The patient might be tempted to use only one or two of the pillows rather than all of the pillows.

Third, traveling with multiple pillows can be problematic. There is an increased risk of losing one of the pillows.

Thus, there is a need for an improved device which can treat several areas of the spine, while also being portable and easily usable.

BRIEF SUMMARY OF THE INVENTION

The present invention provides a new and improved anatomical support device. More particularly, the present invention provides a new and improved anatomical support device that may be used to treat the curvature of the spine.

In a particular embodiment, an anatomical support device includes an upper portion and a contoured upper portion. The lower portion has a bottom side and a top side. The lower portion has a length measured along the bottom side extending between a front and a rear of the lower portion. The contoured upper portion extends from the top side of the lower portion. The contoured upper portion is aligned with the length. The contoured upper portion separates a first support region of the top side of the lower portion from a second support region of the top side of the lower portion. The contoured upper portion has a width that is generally perpendicular to the length. The length is greater than any portion of the width. The contoured upper portion has a center line extending parallel to the length. The contoured upper portion at the centerline is continuously curved along at least 95% of the length.

In an embodiment, the centerline is centered between the first and second support regions of the top side.

In an embodiment, the centerline is continuously convexly curved along at least 95% of the length.

In an embodiment, a height of the contoured upper portion is measured perpendicularly from the bottom side at the centerline. A centerline maximum height is located along the length between 65% and 90% of the length from the front.

In an embodiment, a first transition region is between the centerline and the first support region forming a transition between the first support region and the contoured upper portion. A second transition region is between the centerline and the second support region forming a transition between the second support region and the contoured upper portion.

In an embodiment, the centerline maximum height is between about 4.5 inches and 5.5 inches. The first support region has a first support region maximum height measured perpendicularly from the bottom side of between 2 inches and 3 inches. The second support region has a second support region maximum height measured perpendicularly from the bottom side of between 2 inches and 3 inches.

In an embodiment, the bottom side of the lower portion has a maximum lower portion width extending between a first side and a second side and that is perpendicular to the length. The first support region has a first support region intermediate height measured half way between the centerline and the first side along the maximum lower portion width measured perpendicularly from the bottom side of between about 1 inch and 2.25 inches. The second support region has a second support region intermediate height measured half way between the centerline and the second side along the maximum lower portion width measured perpendicularly from the bottom side of between about 1 inch and 2.25 inches.

In an embodiment, the bottom side is a generally planar surface and the first support region is a generally convex surface between the bottom side and the first transition region and the second support region is a generally convex surface between the bottom side and the second transition region.

In an embodiment, the top side of the lower portion and the contoured upper portion are formed from a single continuous piece of material.

In a further embodiment of an anatomical support device, the device includes a lower portion and a contoured upper portion. The lower portion has a bottom side and a top side. The lower portion has a length measured along the bottom side extending between a front and a rear of the lower portion. The contoured upper portion extends from the top side of the lower portion. The contoured upper portion is aligned with the length. The contoured upper portion separates a first support region of the top side of the lower portion from a second support region of the top side of the lower portion. The contoured upper portion has a width that is generally perpendicular to the length. The length being greater than any portion of the width. A maximum width of the contoured upper portion measured perpendicular to the length is located within 25% of the length from rear of the lower portion. A minimum width of the contoured upper portion measured perpendicular to the length is located within 25% of the length from the front of the lower portion.

In an embodiment, the contoured upper portion has a centerline extending parallel to the length. A height of the contoured upper portion is measured perpendicularly from the bottom side at the centerline. The centerline maximum height is located along the length between 65% and 90% of the length from the front.

In an embodiment, the contoured upper portion is continuously convexly curved along at least 95% of the length at the centerline being.

In an embodiment, the width of the contoured upper portion decreases in value when moving from the rear to the front parallel to the length along at least 80% of the length.

In a further embodiment of an anatomical support device, the device includes a lower portion having a bottom side and a top side. The bottom side of the lower portion is substantially planar and has a first stiffness. The top side of the lower portion has a second stiffness less than the first stiffness. The contoured upper portion extends from the top side of the lower portion. The contoured upper portion separates a first support region of the top side of the lower portion from a second support region of the top side of the lower portion.

In an embodiment, the contoured upper portion and the first and second support regions are formed from a continuous first piece of material and the bottom side is formed from a second piece of material attached to the first piece of material.

In an embodiment, the first and second pieces of material form an inflatable cavity therebetween.

In an embodiment, the bottom side has a length and a width that are perpendicular to one another. The contoured upper portion has a maximum height measured from the bottom side that is measured perpendicular to the length and the width, the maximum height being between 25% and 50% of the length and between 20% and 50% of the width.

In an embodiment, a maximum height of the first and second support regions measured perpendicular to the bottom side is between 2 inches and 3 inches and the maximum height of the contoured upper portion is between 4 and 6 inches.

In a further embodiment of an anatomical support device, the device includes a lower portion and a contoured upper portion. The lower portion has a bottom side and a top side. The top side has a first gripping characteristic. The contoured upper portion extends from the top side of the lower portion. The contoured upper portion separates a first support region of the top side of the lower portion from a second support region of the top side of the lower portion. The contoured upper portion has a second gripping characteristic that is greater than the first gripping characteristic.

In an embodiment, the first and second gripping characteristics are coefficient of frictions that are different.

A contoured device provides traction and/or anatomical correction of the curves for the cervical portion, the lumbosacral (the lumbar vertebrae and the sacrum) portion and the thoracic portion of the spine. The contoured device includes a lower portion and a top portion. The contoured device where the lower portion contains a plurality of lower portion chambers and the top portion has a top portion chamber, and the lower portion chambers and the top portion chamber are in hydraulic communication.

The contoured device provides anatomical correction of the curves for the cervical portion, the lumbosacral portion, or the thoracic portions of the spine. The contoured device could include a lower portion and a top portion. The lower portion of the device could contain a plurality of lower portion chambers and the top portion has a top portion chamber, where the lower portion chambers and the top portion chamber are in hydraulic communication.

The contoured device provides anatomical traction for the cervical portion, the lumbosacral portion, or the thoracic portions of the spine. The contoured device could include a lower portion and a top portion. The lower portion of the device could contain a plurality of lower portion chambers and the top portion has a top portion chamber, where the lower portion chambers and the top portion chamber are in hydraulic communication.

Other aspects, objectives and advantages of the invention will become more apparent from the following detailed description when taken in conjunction with the accompanying drawings. Further, features disclosed and described with reference to one embodiment can be incorporated into other embodiments where not expressly so identified unless contradictory.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

With reference to FIGS. 1, 2, 3, 4, 5 and 5A, a first embodiment of an anatomical support device 5 (also referred to as "device 5") is illustrated. The anatomical support device 5 finds particular use for anatomical traction or correction of the spine.

Figure 1:
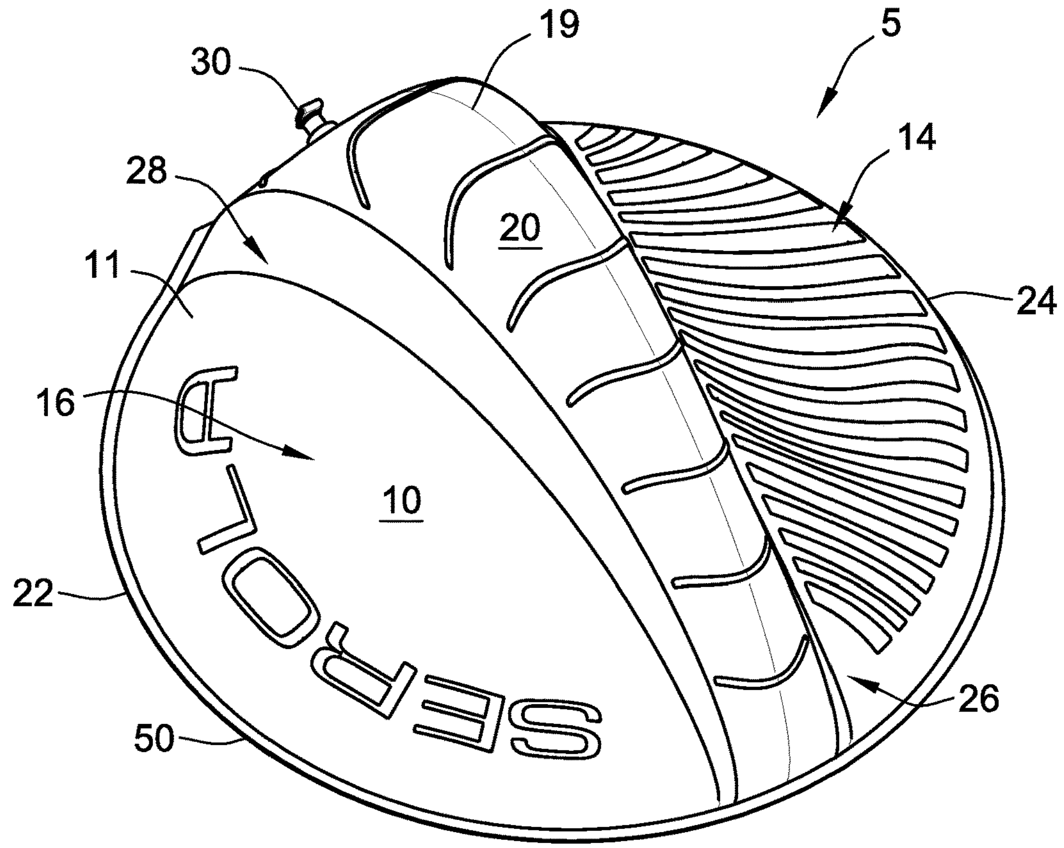
FIG. 1 is a perspective drawing of an embodiment of the invention.
Figure 2:
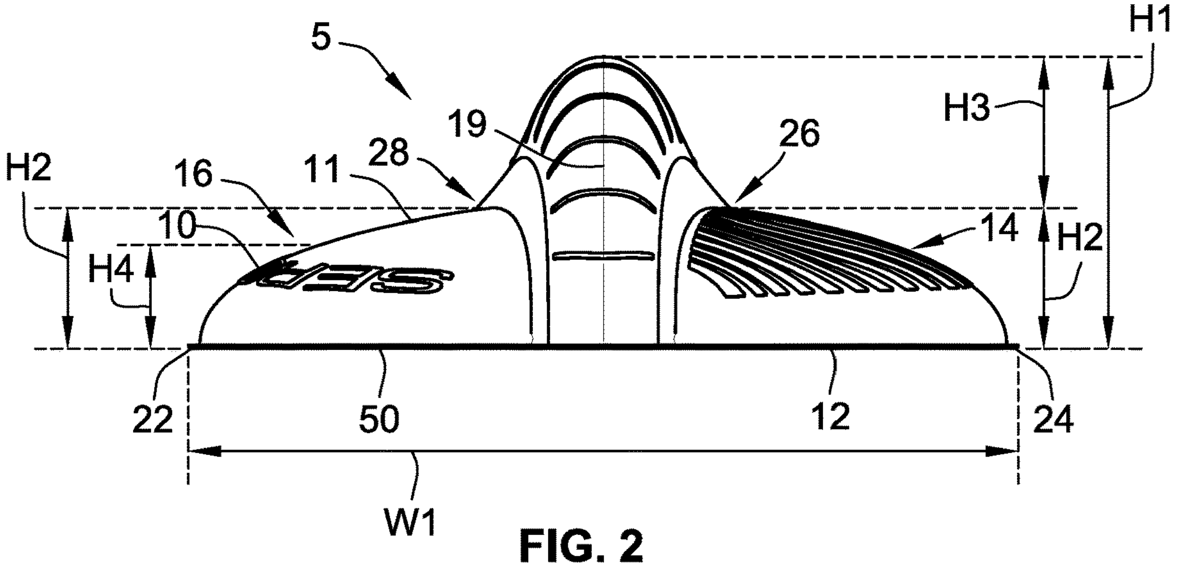
FIG. 2 is a frontal view of the embodiment of the invention.

With reference to FIGS. 1 and 2, the device 5 has a generally disc shaped lower portion 10 and a relatively ridge-shaped contoured upper portion 20 through the center of the disc shaped lower portion 10. The lower portion 10 has a top side 11 and a bottom side 12 that is opposite the top side 11. The top and bottom sides 11, 12 face generally away from one another. The bottom side 12 is generally planar while the top side is generally continuously convex as illustrated in FIG. 2.

The upper portion 20 extends from the top side 11 of the lower portion 10. The upper portion 20 separates the top side 11 into first and second support regions 14, 16 on opposed sides of the upper portion 20. The upper portion 20 extends longitudinally generally along the center of the lower portion 10 generally between a front 17 and a rear 18 of the bottom side. The bottom side 12 defines a length L1 extending between the front 17 and rear 18. The upper portion 20 extends along the length L1.

With reference to FIGS. 1-4, the upper portion 20 has a centerline 19 that generally aligns with length L1 and that is defined by a maximum height of the upper portion 20 when measured from the bottom side 12 at any location axially along length L1. The centerline 19 is generally centered relative to a maximum lower portion width W1 of the bottom 12 extending between opposed first and second sides 22, 24 of the bottom 12. More particularly, the centerline 19 is generally centered between the first and second support regions 14, 16.

Figure 4:
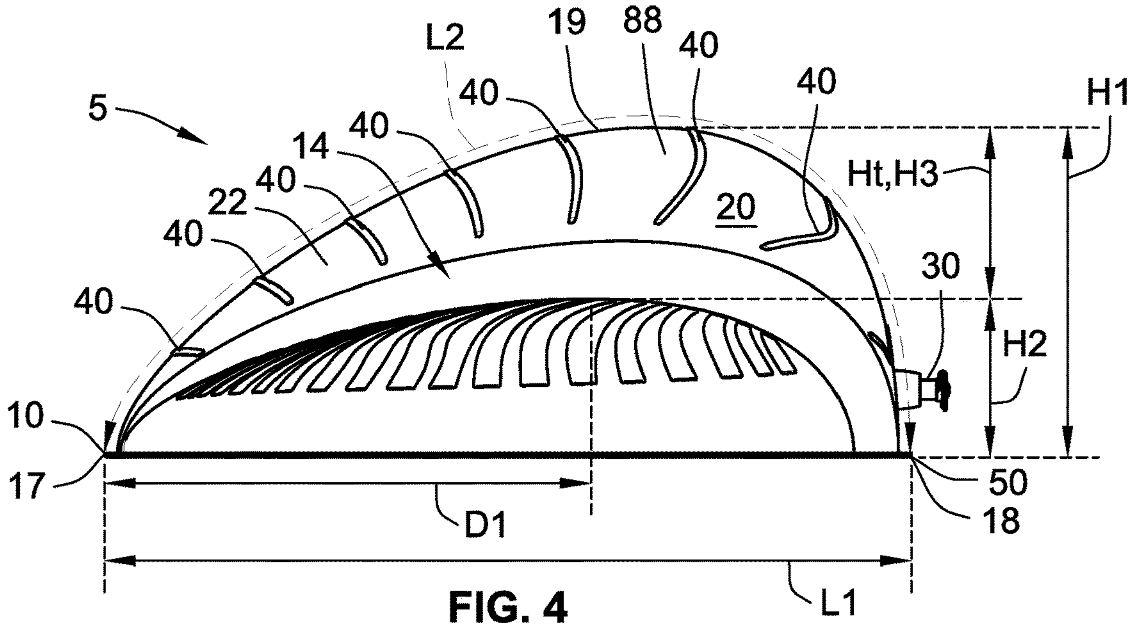
FIG. 4 is a side view of the embodiment of the invention.

With reference to FIGS. 2 and 4, the upper portion 20 has a centerline maximum height H1 measured from the bottom side 12 that ranges between 4 and 6 inches and more preferably between 4.5 and 5.5 inches. Each support region 14, 16 has a maximum height H2 that ranges between 2 and 3 inches measured from the bottom side 12. As such, the upper portion 20 has a maximum height H3 extending from the support regions 14, 16 that is substantially similar to the maximum height H2 of the support regions 14, 16 such that the upper portion 20 can be viewed as having the same height as the lower portion 10.

Due to the contour of the upper portion 20, the centerline maximum height H1 is located closer to the rear 18 rather than the front 17. Preferably, the centerline maximum height H1 is offset a distance D1 from the front 17 that is between about 65% and 90% of the length L1 and more preferably between about 75% and 85% of the length L1. Further, the upper portion has a length L2 measured along the centerline 19 from the front 17 to the rear 18.

Preferably the various height values for the centerline 19 measured from the bottom 12 provide the upper portion 20 proximate the centerline 19 with a continuously convexly curved profile as illustrated in FIG. 4 along at least 95% of the length L1. It is note that the inclusion of support ridges 40 described below are not considered in this continuously convexly curved profile.

Each of the first and second support regions 14, 16 has a support region intermediate height H4 (see FIG. 2) measured half way between the centerline 19 and the first and second sides, 22, 24, respectively, and perpendicularly from the bottom side 12 of between 1 inch and 2.25 inches. Further, the portion of the top side 11 forming the first and second support regions 14, 16 is convexly shaped.

With reference to FIG. 2, transition regions 26, 28 form transitions between the first and second support regions 14, 16 and the upper portion 20. The transition between the upper portion 20 and the top side 11 of the bottom portion 10 may be viewed as a valley between the upper portion 2 and support regions 14, 16. As noted above, the first and second support regions 14, 16 may be convexly shaped. More particularly, the first support region 14 is a generally convex surface of the top side 11 between the bottom side 12 and the first transition region 26 and the second support region 16 is a generally convex surface of the top side 11 between the bottom side 12 and the second transition region 28. While the figures illustrate that the maximum height H2 of the support regions 14, 16 is generally equal to the adjacent transition regions 26, 28, in some embodiments, the transition regions 26, 28 may be recessed below adjacent portions of the adjacent support regions 14, 16 due to a slight ballooning effect due to inflation of the lower portion 10. This is due to the use of a flexible plastic material to form the device 5.

The device 5 is generally inflatable to establish the shape illustrated in the figures. A valve 30 is positioned at the rear 18 of the device 5. The valve 30 allows a user to place air into the device 5 or remove air from the device 5. Thus, the device 5 is inflatable and deflatable. While illustrated in a particular location, the valve 30 could be located on the bottom side as well or in other locations as necessary.

The upper portion 20 has a plurality of support ridges 40 extending across the top of the upper portion 20. The support ridges 40 extend generally laterally across the center line of the upper portion 20. The upper portion 20 and the top 61 form a top portion chamber 22.

Figure 5:
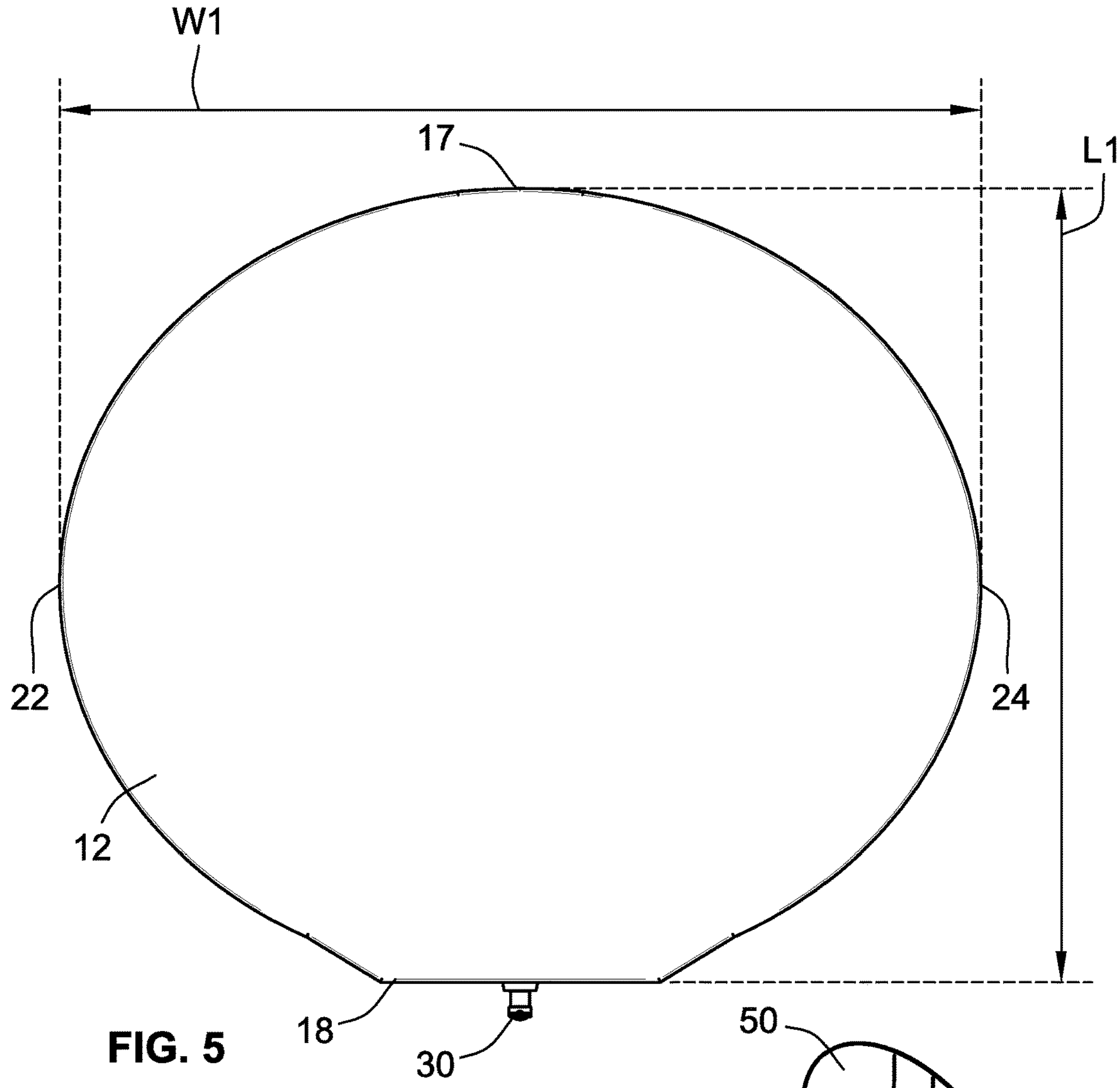
FIG. 5 is a bottom view of the embodiment of the invention.
Figure 5A:
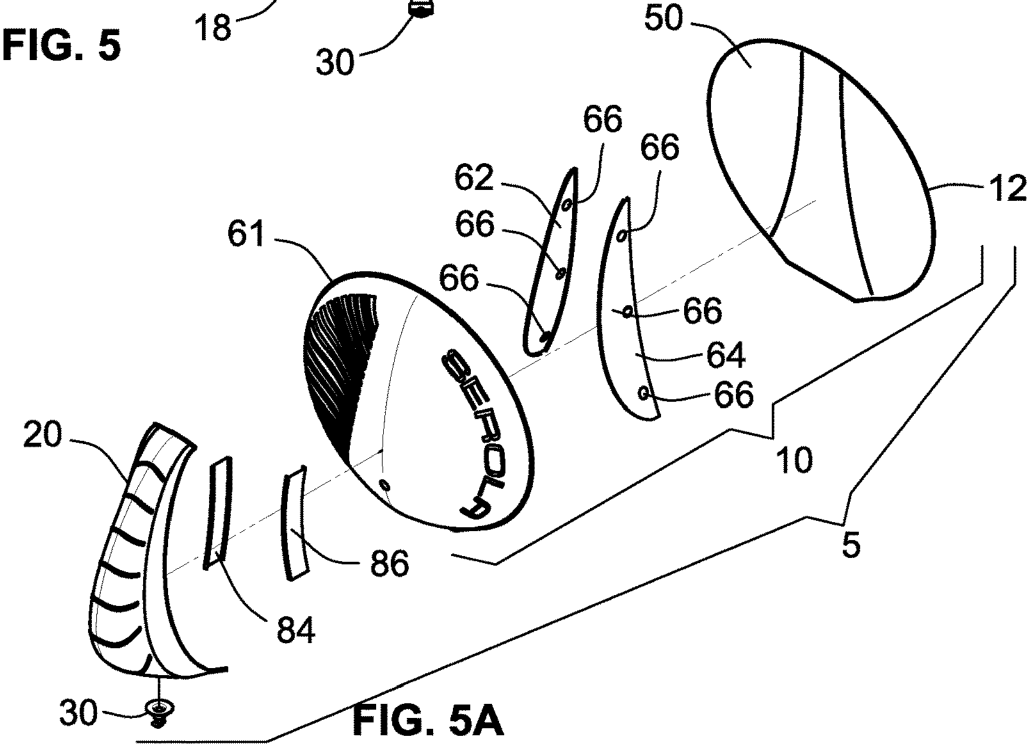
FIG. 5A is an exploded view of the embodiment of the invention.

As shown in FIG. 5A, the device 5 is made of several subcomponents. The subcomponents will be discussed with reference to FIG. 5A and the following drawings.

Figure 6:
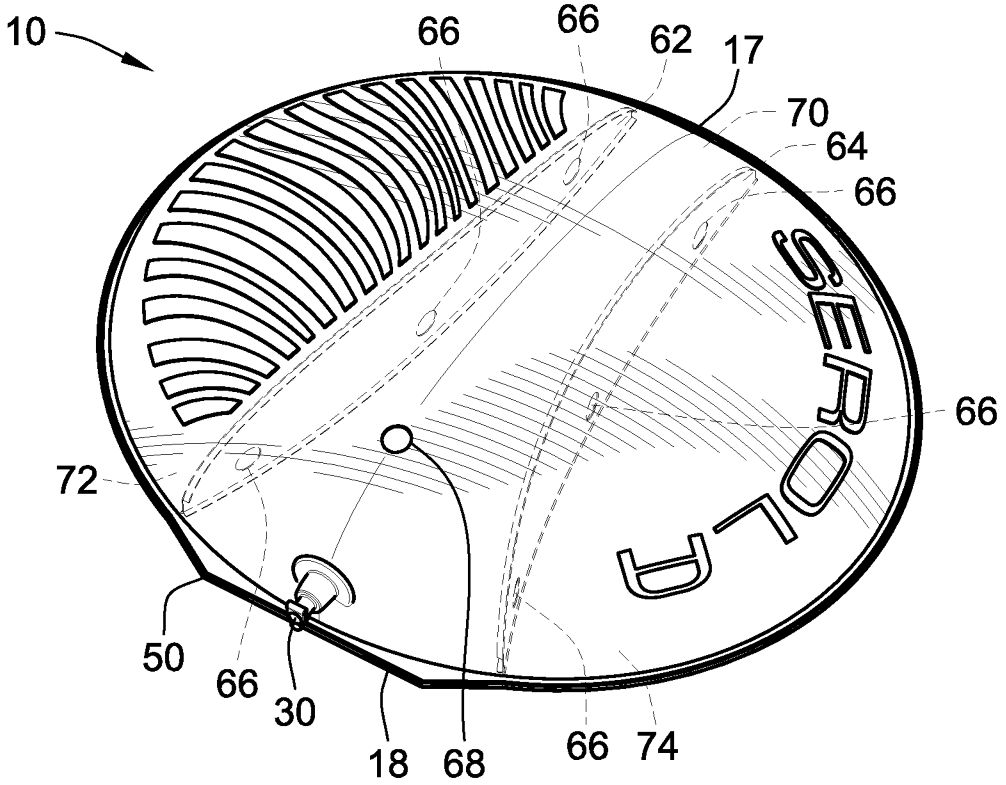
FIG. 6 is a transparent and perspective view of the lower portion of the embodiment of the invention.

FIG. 6 is a perspective view of the lower portion 10. The lower portion includes a top 61, shown in FIG. 5A. The top 61 defines the top side 11 and the support regions 14, 16, described previously. The top 61 is made from a mostly transparent material in order to facilitate a view of the interior of the lower portion 10.

The lower portion 10 includes the valve 30 to allow for the inflation and deflation of the device 5 as indicated previously. The lower portion 10 also includes a first baffle 62 and a second baffle 64. The first baffle 62 and the second baffle 64 include at least one baffle port 66 to permit air to freely flow within the lower portion 10 during inflation. In the embodiment shown, there are three baffle ports 66 in each baffle 62, 64 for a total of six baffle ports 66. There could be a single baffle port 66 in each baffle 62, 64. Alternatively, there could be more than three baffle ports 66 in each baffle 62, 64. The baffle ports 66 could also be any shape, such as oval or rectangular.

As a further alternative, the baffles 62, 64 could be configured such that the baffles 62, 64 are shorter in length creating one or more air flow gaps. The gap would allow the air to flow around the baffles 62, 64 rather than through the baffles 62, 64. Such a configuration which would reduce the need for baffle ports 66, and possibly eliminate the baffle ports 66.

Additionally, there is a top port 68 which is located in top 61 that extends through top side 11. Top port 68 allows air to flow between the upper portion 20 and lower portion 10 to inflate and deflate the upper portion using valve 30.

The first baffle 62 and the second baffle 64 divide the lower portion 20 into three lower portion chambers: a main chamber 70, a first side chamber 72, and a second side chamber 74.

When air is provided to the device 5 through the valve 30, air travels first into the main chamber 70. Air then goes through ports 66 and into the first side chamber 72 and the second side chamber 74. Air also travels through top port 68 and into the upper portion 20.

If, as mentioned previously, the baffles 62, 64 were sufficiently small forming gaps, air could flow through the gap.

The chambers 70, 72, 74 and the upper portion 20 are thereby fluidly interconnected. That is, if pressure is applied to the exterior of the device 5, then the pressure affects the chambers 70, 72, 74 and the upper portion 20.

Figure 6A:
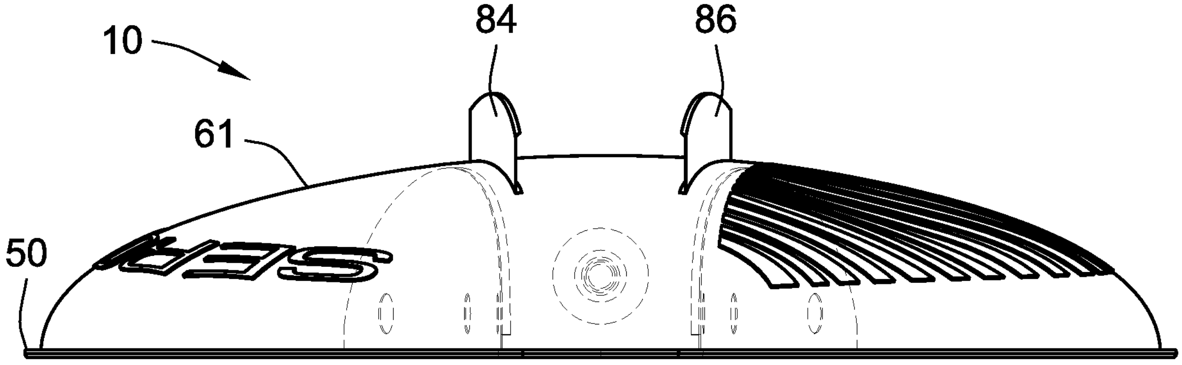
FIG. 6A is a view of the front of the lower portion of the embodiment of the invention, more clearly showing a pair of support structures.

FIG. 6A is a front view of the lower portion 10 including support structures 84, 86 that heat welded to the top side 11 of top 61. The support structures 84, 86 are subsequently heat welded to the interior of upper portion 20. The support structures 84, 86 provide support for and maintain the shape of the upper portion 20. Further the top 61 is welded, typically ultrasonically, to the base 50. It is note that the rear 18 of the base 50 and top 61 includes a straight section (see e.g. FIGS. 3 and 5) which facilitates alignment for the welding process such that the weld need not be performed on an entirely curved peripheral shape.

Further, the baffles help maintain the shape of the lower portion 10 and limit or prevent undesirable excess ballooning of the top side 11. In this embodiment, the baffles 62, 64 are ultrasonically welded to the inner surfaces of the top side 11 and bottom side 12. The transition regions 26, 28 illustrated in FIG. 2 will generally form where the baffles 62, 64 are welded to the inner side of top side 11. In this embodiment, the upper portion 20 is also ultrasonically welded to the top side 11 on an outer surface at the transition regions 26, 28.

Figure 7:
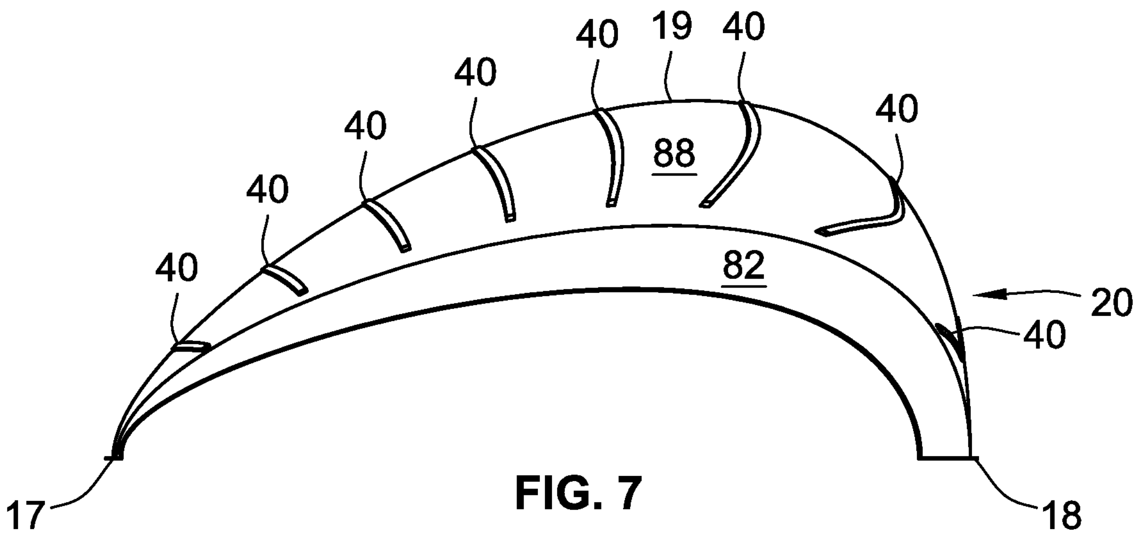
FIG. 7 is a side view of the upper portion of the embodiment of the invention.
Figure 8:
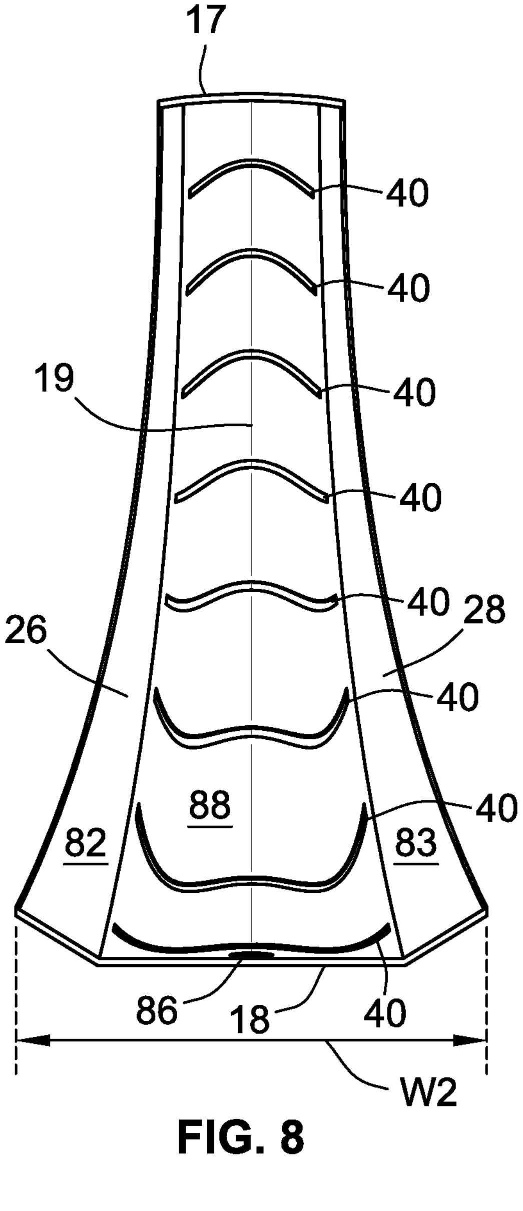
FIG. 8 is a top view of the upper portion of the embodiment of the invention.

FIG. 7 is a side view of the upper portion 20. In this embodiment, the upper portion 20 is formed separately from top 61. FIG. 8 is a top view of the upper portion 20.

The upper portion 20 includes side panels 82, 83 and an upper portion top 88. Free ends of the side panels 82, 83 are ultrasonically welded to the outer surface of top side 11 proximate the transition regions 26, 28.

The ridges 40 run transversely across the upper portion top 88. There are one or more ridges 40. There could as many or more than twenty ridges 40.

Figure 3:
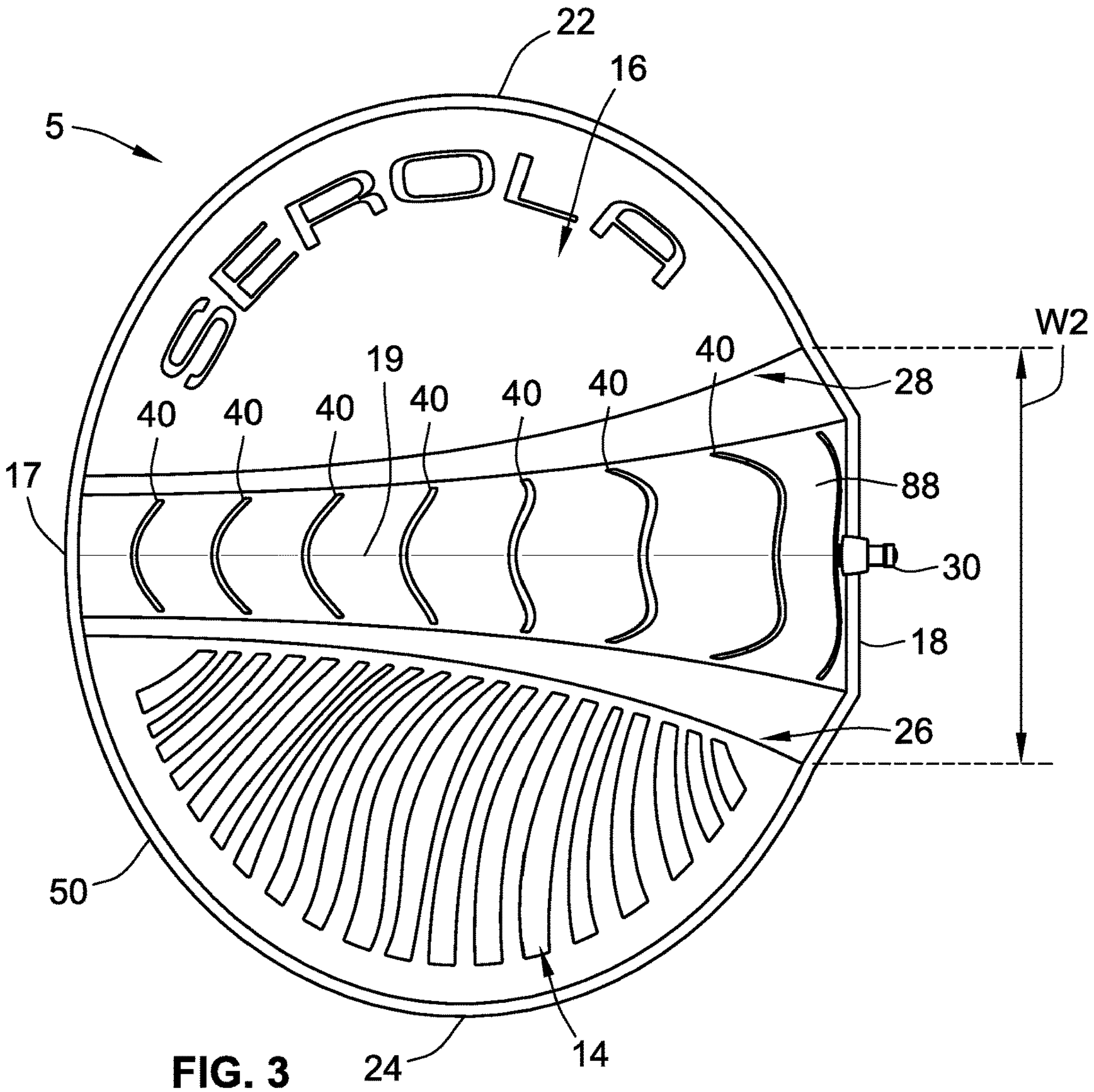
FIG. 3 is a top view of the embodiment of the invention.

As illustrated in FIG. 8, the upper portion 20 tapers in width when moving from the rear 18 toward the front 17. This is also illustrated in FIG. 3. More particularly, the width W2, measured perpendicularly to centerline 19 and length L1, decreases when moving from the rear 18 toward the front 17. Further, the width W2 is less than the length L1.

Ideally, the width W2 of the upper portion 20 tapers for at least 80% of the length L1 and more preferably at least 90% of the length. In this embodiment, the transition regions 26, 28 taper for less than the entire length while upper portion top 88 tapers the entire length L1 from the rear 18 to the front 17.

This tapering of the width W2 of the upper portion 20 provides for the ability to adjust to the shape of the body based on the placement required when using for lumbrosacral traction.

The upper portion 20 also includes an upper portion port 86. The valve 30 extends through the upper portion port 86 and into the main chamber 70.

Due to the previously described features of the device 5, the device 5 can be used in at least three different modes. To use the device 5, the device 5 is inflated using valve 30. The degree of inflation of device 5 can be changed dependent upon the needs of the user.

In order to assist a user of the device 5, the outside of the upper portion 20 is somewhat tacky, and thus does not slide easily. On the other hand, the outside of the lower portion 10 is relatively slick, allowing a user to slide his or her body easily on the top side 11. As such, in some embodiments, the upper portion 20 has a higher gripping characteristic than the top side 11 and particular first and second support regions 14, 16. Typically, this gripping characteristic may be defined in terms of a coefficient of friction. In general, however the gripping characteristics are such that the user will slide more easily on the first and second support regions than the upper portion 20.

The device 5 is preferable made of a thermoplastic urethane. However, it could be possible to make the device from foam or a different type of plastic and achieve similar results.

Figure 9:
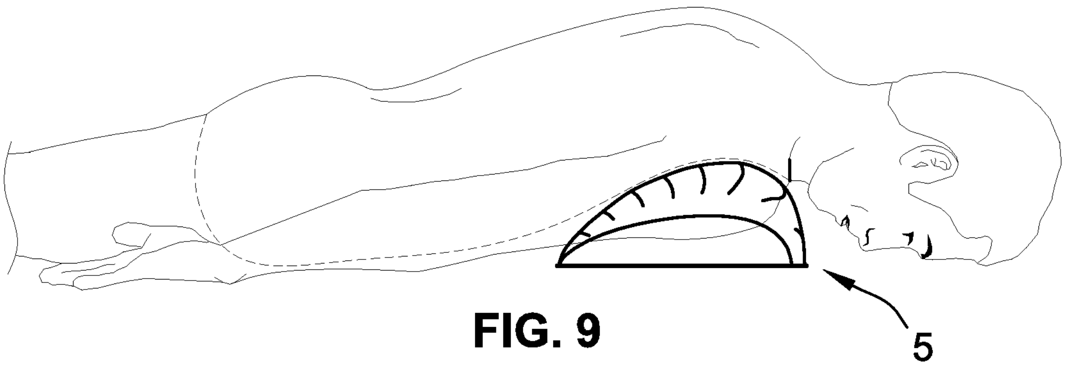
FIGS. 9-11 show simplified modes of use of the invention.

FIG. 9 shows a first mode of use of the device 5. The device 5 is placed with the base 50 on the surface. A user then lies on the device 5.

As shown in FIG. 9, the device 5 is placed under the chest of the patient as high as it can be positioned without interference with his or her neck but could be moved toward the feet to affect lower areas of the thoracic spine as needed. The head of the patient may hang downwardly as shown or the forehead of the patient may rest on surface. If the patient's head does not hang comfortably so that the patient has to turn his or her head, then a book or other object may be placed under the device 5 to raise the person up high enough to comfortably use the device 5 without turning his/her head. If the forehead does not reach surface and is uncomfortable, as shown in FIG. 9, the patient may place a rolled towel or some other article under his or her forehead. It is important to keep one's head straight so that the vertebrae and ribs are in a normal position.

Figure 10:
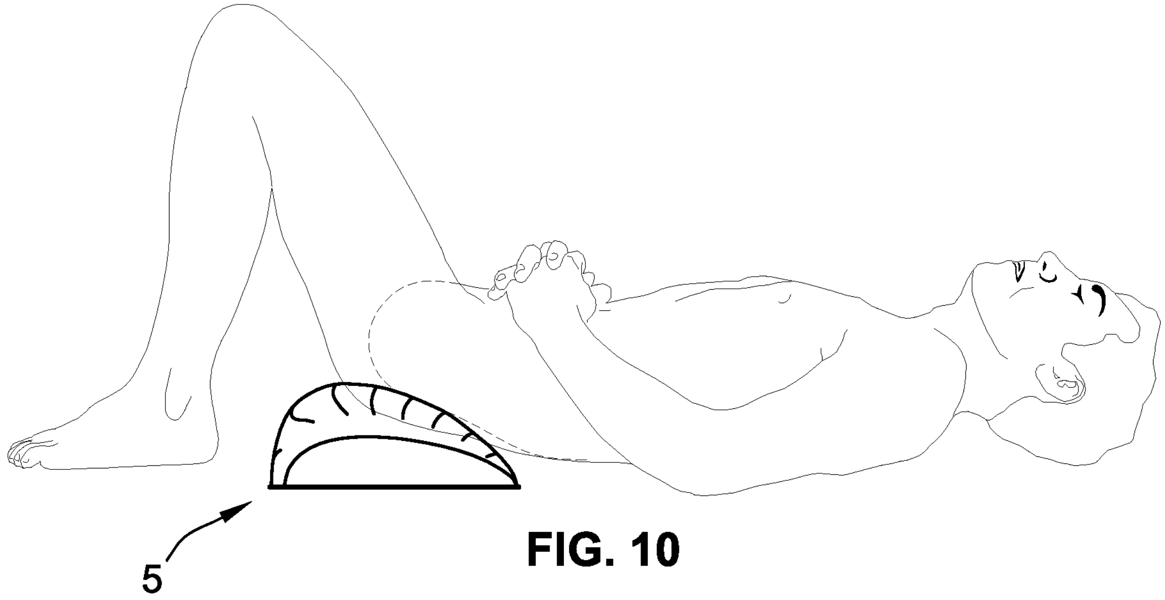

As shown in FIG. 10, the device 5 can be positioned under the buttocks of a user. In this mode of use of the device 5, because the top side 11 of the lower portion 10 is relatively slippery, the buttocks slides easily on the device 5 while the upper portion 20 has a greater gripping characteristic.

Figure 11:
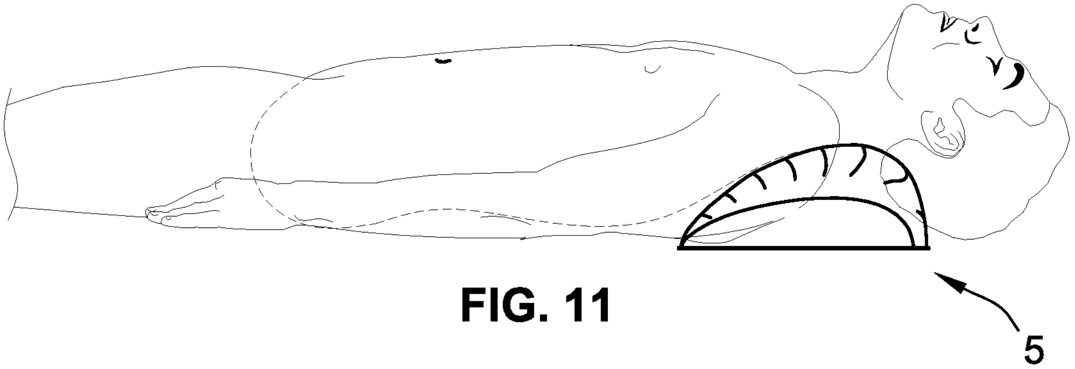
Figure 12:
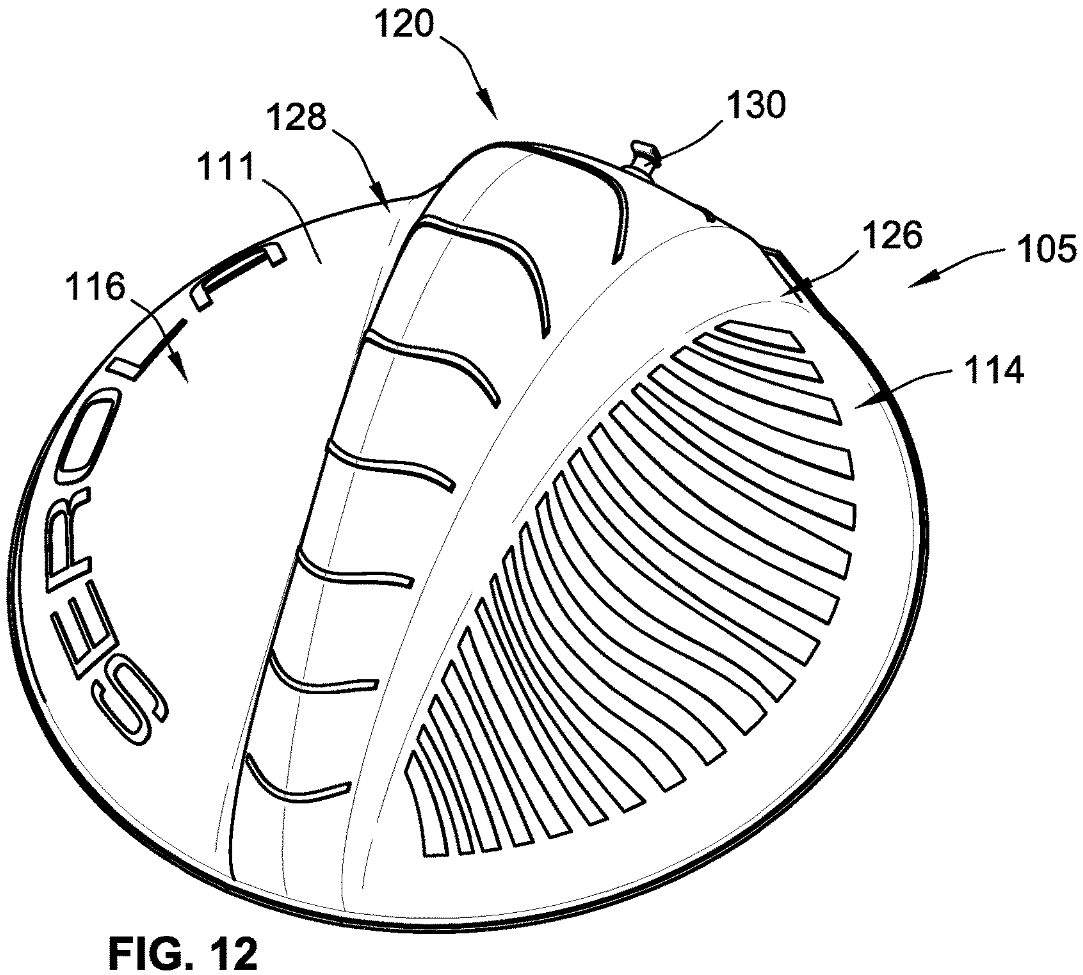
FIG. 12 is a perspective drawing of an embodiment of the invention.
Figure 13:
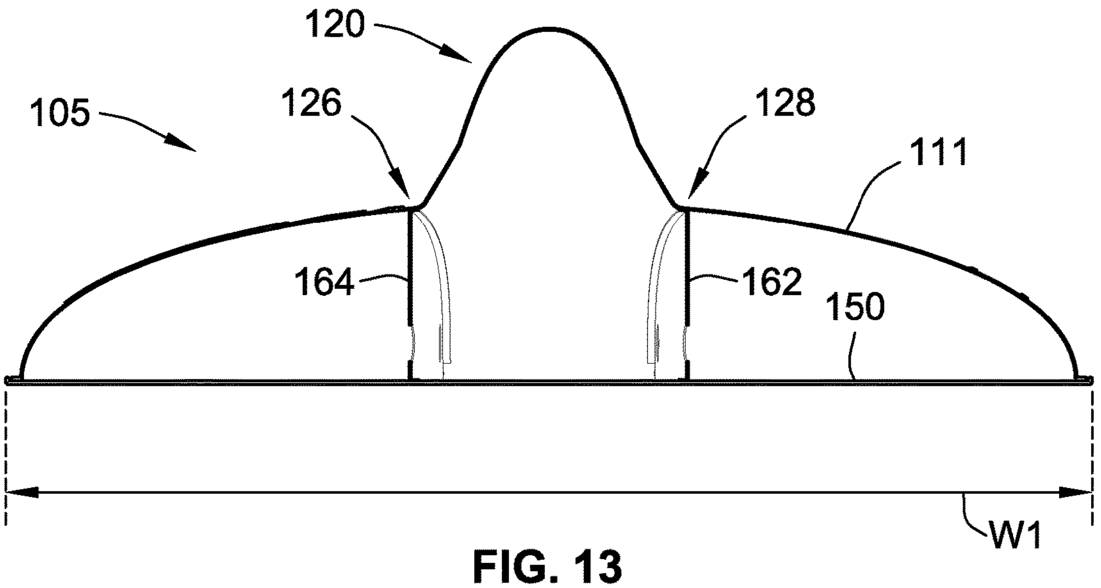
FIGS. 13 and 14 are cross-sectional drawings of the embodiment of FIG. 12.
Figure 14:
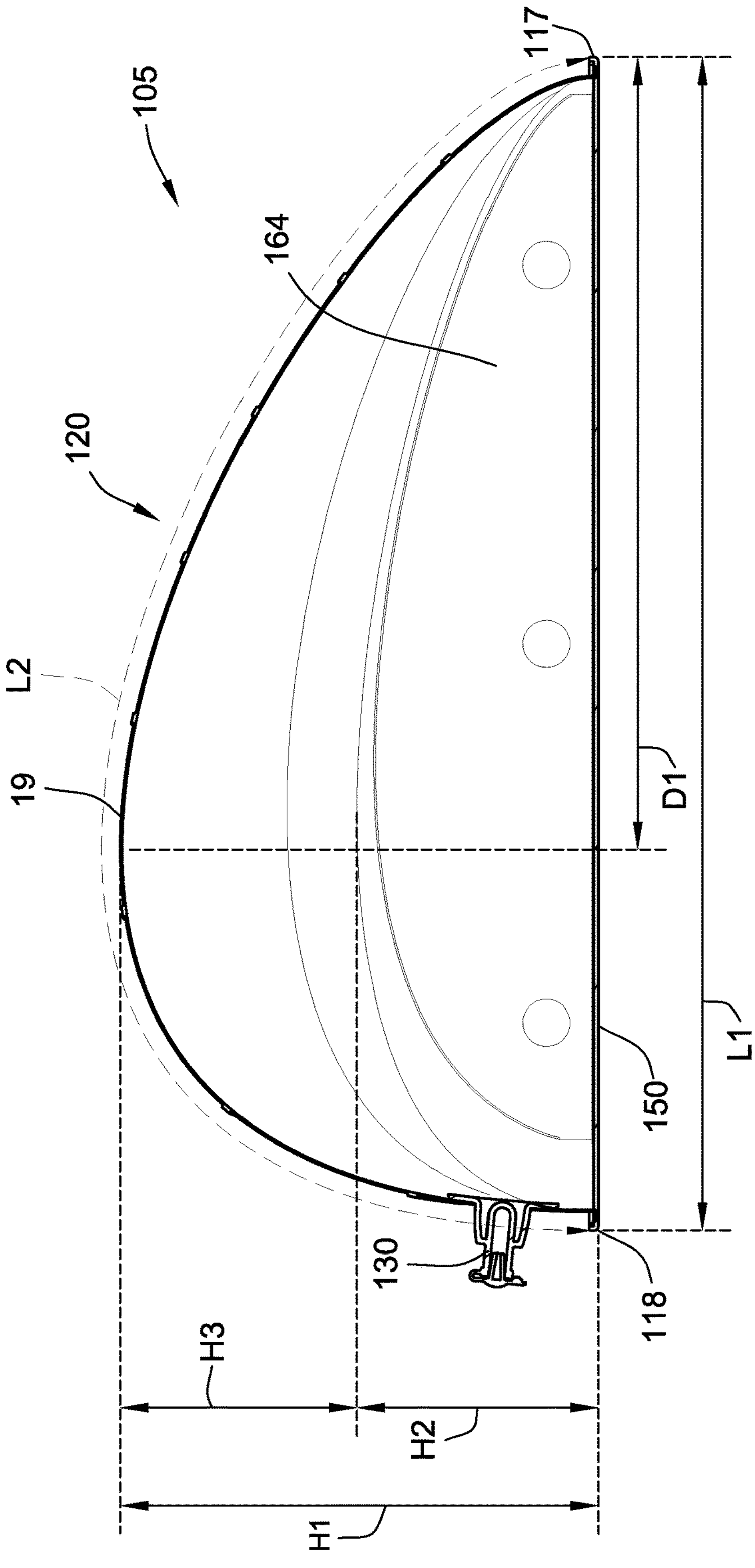

Finally, as shown in FIG. 11, the device 5 can be positioned under the neck of the user. When positioned in this manner, the top portion 20 does not slide under the neck of the user, but rather tends to maintain contact with the neck of the user.

In these various modes of operation, the hydraulic nature of the device 5 assists in inflating portions of the device 5 while allowing other portions of the device to deflate. E.g., in FIG. 9, the air within the lower portion 10 of the device 5 is pushed into the upper portion 20 of the device, thus increasing the firmness of the upper portion 20. In FIG. 10, the air within the lower portion 10 is pushed into the upper portion 20, thereby increasing the firmness of the upper portion 20. Finally, in FIG. 11, some of the air within the lower portion 10 is pushed into the upper portion 20, increasing the firmness of the upper portion 20.

The shape of device 5 generally matches the desired curvature of the patient's cervical, thoracic and lumbar spine but not the lumbosacral spine. Because the device 5 is inflatable, it is not necessary to match cervical and thoracic curves exactly; instead, we put force in the direction of correction. This allows for treatment of the lumbosacral spine. The device 5 applies an anteriorly directed force on the sacral apex which leverages the sacral base and the adjacent vertebrae posteriorly, thereby decreasing the hyperlordotic lumbosacral curve. The device 5 leverages the lumbosacral curve toward the correct form from outside the curve.

Figure 16:
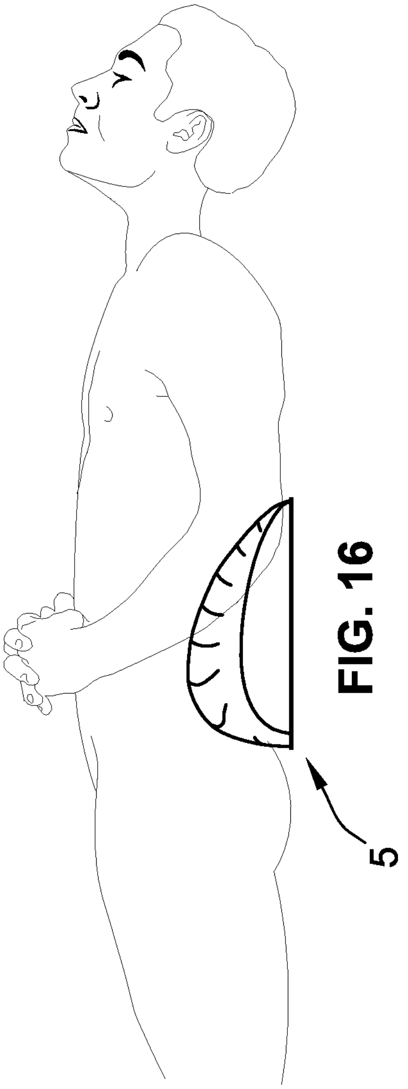
FIGS. 16-17 show further simplified modes of use of the invention.

As shown in FIG. 16, when the device 5 is positioned under the lumbar spine, it fills in the lumbar curve and tapers to create a smooth transition into the lower thoracic area.

Figure 17:
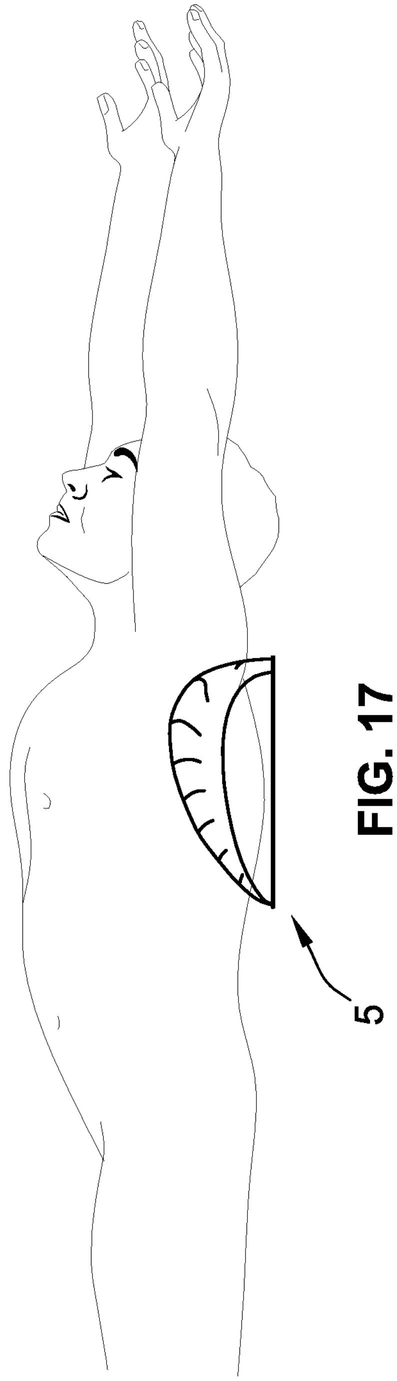

As shown in FIG. 17, when the patient is supine, the device 5 is positioned under the thoracic spine and the arms are placed either above the head or out to the side. The device puts pressure on the thoracic spine in a posterior to anterior direction to help reduce a hyperkyphotic thoracic curve.

U.S. Pat. No. 4,969,222, entitled CONTOURED SUPPORT PILLOW; U.S. Pat. No. 5,201,761, entitled DEVICE AND METHOD FOR REDUCING LUMBAR LORDOSIS WHILE SUPINE AND SUPPORTING THE LUMBAR CURVE WHEN SEATED, U.S. Pat. No. 7,055,199, entitled LUMBAR BACK SUPPORT DEVICE, and U.S. Pat. No. 8,695,135, entitled SACRUM SUPPORT PILLOW, are hereby incorporated by reference.

FIGS. 12-15 illustrate a further embodiment of an anatomical support device 105. The device 105 is similar in many ways and functions as device 5 described above. The device 105 will have the same dimensional features as device 5 described previously.

Figure 15:
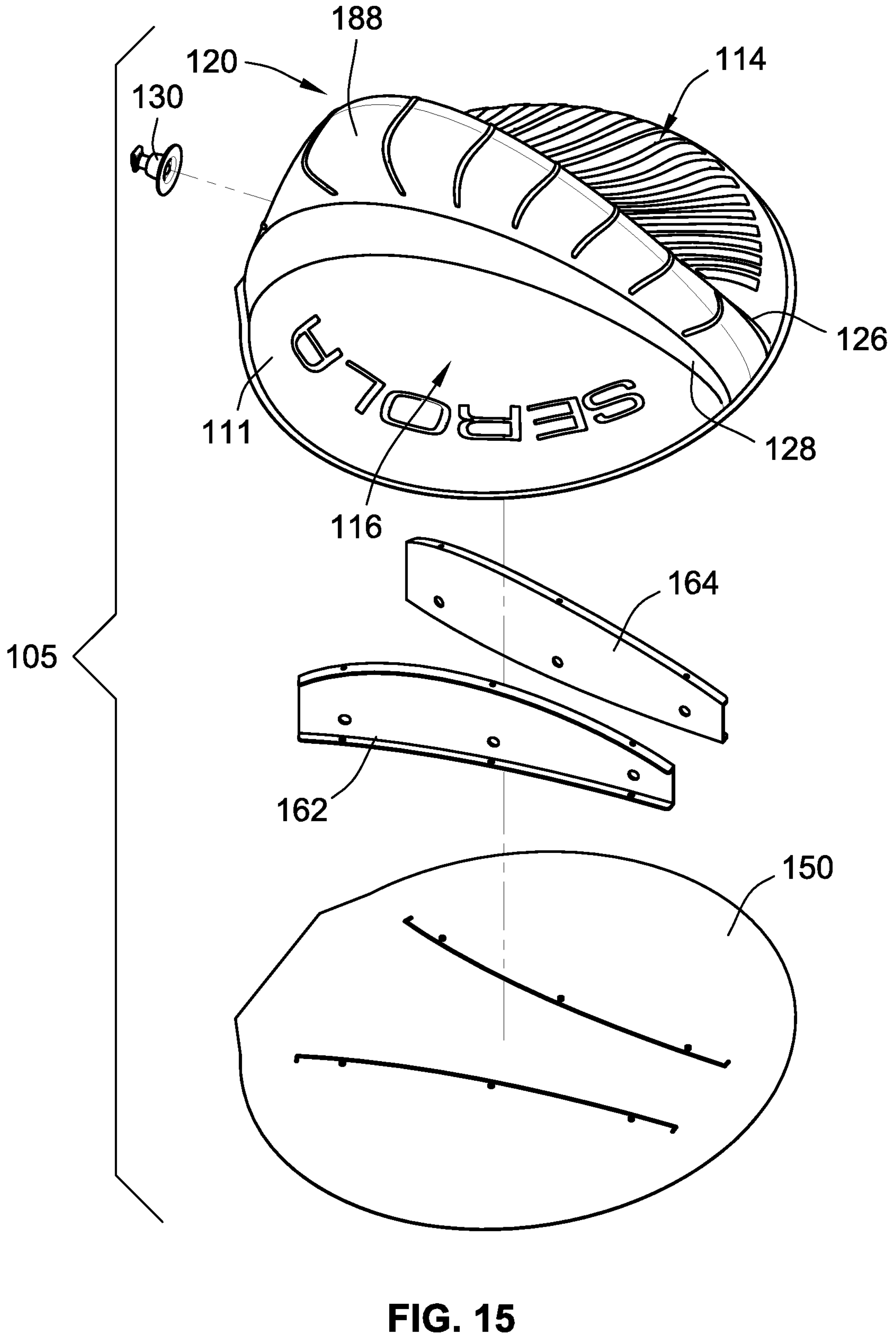
FIG. 15 is an exploded view of the embodiment of FIG. 12.

With reference to FIG. 15, device 105 is formed from fewer components. In this embodiment, the upper portion 20 and top 61 of the prior embodiment are formed into a single component. As such, top side 111 and upper portion 120 are formed from a single continuous piece of material. This single component is then welded to base 150. This prevents the need for the additional structural members between top 61 and upper portion 20 of the prior embodiment. Due to this configuration, the first and second support regions 114, 116, transition regions 128, 126 and upper portion 120 (including upper portion top 188) are all formed from a single continuous piece of material. Typically, the single piece of material will be ultrasonically welded to the base 150. The single piece of material may be vacuum formed to include the shape and features of this embodiment.

The base may be formed of the same type of material but processed in a different manner to provide greater rigidity/stiffness as compared to the single piece of material that forms the top side 11 and upper portion 120. Alternatively, the base could be formed from a different type of material.

Further, as noted previously, the first and second support regions 114, 116 may have a different gripping characteristic as compared to the upper portion 120, such as a different coefficient of friction. This may be done by processing the first and second support regions 114, 116 different than the upper portion 120 or by features that are formed into the different sections of the device 105.

In this embodiment, baffles 162, 164 are provided to help maintain the shape of the device 105 when fully inflated. The transition regions 128, 126 are generally formed proximate where the baffles 162, 164 are adhered, typically ultrasonically welded, to the single continuous piece of material that defines the upper portion 120 and the support regions 114, 115. In this embodiment, because the upper portion 120 and the support regions 114, 115 are formed from a single piece of material, the baffles 162, 164 prevent significant ballooning of the top side 111 due to inflation of the device 105. Again, the rigid base 150 can help inhibit excessive ballooning. The base 150 will be generally planar but some level of curvature shall be acceptable and still be considered generally planar as long as the general disc shaped profile of the lower portion 110 is maintained.

Again, a valve 130 is provided to permit inflation and deflation of the cavity formed by base 150 and the component that provides top side 111 and upper portion 120.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An anatomical support device comprising:

a lower portion having a bottom side and a top side, the lower portion has a length measured along the bottom side extending between a front and a rear of the lower portion;

a contoured upper portion extending from the top side of the lower portion, the contoured upper portion is aligned with the length, the contoured upper portion having an upper surface, the contoured upper portion separating a first support region of the top side of the lower portion from a second support region of the top side of the lower portion;

the contoured upper portion having a width that is generally perpendicular to the length, the length being greater than any portion of the width, the contoured upper portion having a centerline extending parallel to the length, the contoured upper portion at the centerline being continuously curved along 95% of the length and less than an entirety of the length;

an inflatable internal cavity of the device defined by the bottom side, the top side and the upper surface;

a first baffle located in the inflatable internal cavity, the first baffle extending from the bottom side to the top side of the lower portion;

a second baffle located in the inflatable internal cavity, the second baffle extending from the bottom side to the top side of the lower portion and spaced apart from the first baffle;

wherein the first baffle and the second baffle are sized and positioned to divide the inflatable internal cavity of the device into three chambers capable of permitting air to freely flow between the three chambers.

2. The device of claim 1, wherein the lower portion and the contoured upper portion are formed from a flexible plastic material and are inflatable and deflatable to adjust the degree of inflation, wherein the contoured upper portion tapers in width when moving from the rear toward the front such that the width measured perpendicularly to the centerline decreases when moving from the rear toward the front, and wherein a height of the contoured upper portion is measured perpendicularly from the bottom side at the centerline, wherein a centerline maximum height is located closer to the rear than to the front.

3. The device of claim 1, wherein the centerline is centered between the first and second support regions of the top side.

4. The device of claim 1, wherein the centerline is continuously convexly curved along at least 95% of the length.

5. The device of claim 4, wherein a maximum height of the centerline is located along the length between 65% and 90% of the length from the front.

6. The device of claim 5, further including a first transition region between the centerline and the first support region forming a transition between the first support region and the contoured upper portion and a second transition region between the centerline and the second support region forming a transition between the second support region and the contoured upper portion.

7. The device of claim 6, wherein the maximum height of the centerline is between about 4.5 inches and 5.5 inches;

wherein the first support region has a first support region maximum height measured perpendicularly from the bottom side of between 2 inches and 3 inches;

wherein the second support region has a second support region maximum height measured perpendicularly from the bottom side of between 2 inches and 3 inches.

8. The device of claim 7, wherein the bottom side of the lower portion has a maximum lower portion width extending between a first side and a second side and perpendicular to the length;

wherein the first support region has a first support region intermediate height measured half way between the centerline and the first side along the maximum lower portion width measured perpendicularly from the bottom side of between about 1 inch and 2.25 inches;

wherein the second support region has a second support region intermediate height measured half way between the centerline and the second side along the maximum lower portion width measured perpendicularly from the bottom side of between about 1 inch and 2.25 inches.

9. The device of claim 8, wherein the bottom side is a generally planar surface and the first support region is a generally convex surface between the bottom side and the first transition region and the second support region is a generally convex surface between the bottom side and the second transition region.

10. The device of claim 6, wherein the top side of the lower portion and the contoured upper portion are formed from a single continuous piece of material.

11. The device of claim 1, wherein a maximum width of the contoured upper portion measured perpendicular to the length is located within 25% of the length from the rear of the lower portion;

wherein a minimum width of the contoured upper portion measured perpendicular to the length is located within 25% of the length from the front of the lower portion.

12. The device of claim 11, wherein a maximum height of the centerline is located along the length between 65% and 90% of the length from the front.

13. The device of claim 11, wherein the contoured upper portion is continuously convexly curved along at least 95% of the length at the centerline.

14. The device of claim 11, wherein the width of the contoured upper portion decreases in value when moving from the rear to the front parallel to the length along at least 80% of the length.

15. The device of claim 1, the bottom side of the lower portion being substantially planar and having a first stiffness, the top side of the lower portion having a second stiffness less than the first stiffness.

16. The device of claim 15, wherein the contoured upper portion and the first and second support regions are formed from a continuous first piece of material and the bottom side is formed from a second piece of material attached to the first piece of material.

17. The device of claim 16, wherein the first and second pieces of material form the inflatable internal cavity therebetween.

18. The device of claim 17, wherein the bottom side has a length and a width that are perpendicular to one another, wherein the contoured upper portion has a maximum height measured from the bottom side that is measured perpendicular to the length and the width, the maximum height being between 25% and 50% of the length and between 20% and 50% of the width.

19. The device of claim 18, wherein a maximum height of the first and second support regions measured perpendicular to the bottom side is between 2 inches and 3 inches and the maximum height of the contoured upper portion is between 4 and 6 inches.

20. The device of claim 1, wherein the top side has a first gripping characteristic; and wherein the contoured upper portion has a second gripping characteristic that is greater than the first gripping characteristic.

21. The device of claim 20, wherein the first and second gripping characteristics are coefficients of friction that are different.

22. The device of claim 1, wherein:

a first gap is defined between the first baffle and the front of the lower portion of the device;

a second gap is defined between the second baffle and the front of the lower portion of the device; and wherein, the first gap and the second gap are configured to permit the air to freely flow between the three chambers.

23. The device of claim 22, wherein:

a third gap, opposite the first gap, is defined between the first baffle and the back of the lower portion of the device;

a fourth gap, opposite the second gap, is defined between the second baffle and the back of the lower portion of the device; and wherein the third gap and the fourth gap are configured to permit the air to freely flow between the three chambers.

24. The device of claim 1, wherein the first baffle and the second baffle each include a top baffle surface and a bottom baffle surface opposite the top baffle surface, the top baffle surface welded to a top inner surface of the top side with a first weld and the bottom baffle surface welded to a bottom inner surface of the bottom side with a second weld, said first and second welds being capable of maintaining in part a shape of the lower portion and preventing ballooning of the contoured upper portion.

25. The device of claim 24, wherein the first weld and the second weld are ultrasonic weldments.

26. The device of claim 24, wherein a pressure applied to the upper surface affects a chamber pressure in each of the three chambers.

27. The device of claim 26, wherein a pressure applied to the top side affects the chamber pressure in each of the three chambers.

28. The device of claim 1, wherein the three chambers comprise a center chamber between a first chamber and a second chamber, the center chamber extending from the lower portion to the contoured upper portion, the first and second chambers located in the lower portion.

29. The device of claim 1, wherein the first baffle and the second baffle each include at least one baffle port capable of permitting the air to freely flow between the three chambers.

30. The device of claim 1, wherein the first baffle and the second baffle each include three baffle ports capable of permitting the air to freely flow between the three chambers.

31. The device of claim 1, wherein a valve located in the lower portion is fluidly connected to the inflatable internal cavity to provide for inflation of the inflatable internal cavity.

* * * * *